United States Patent
Shimada et al.

(10) Patent No.: US 12,339,952 B2
(45) Date of Patent: Jun. 24, 2025

(54) PROGRAM ANALYSIS DEVICE, PROGRAM ANALYSIS METHOD, AND COMPUTER-READABLE MEDIUM

(71) Applicant: NEC Corporation, Tokyo (JP)

(72) Inventors: Yusuke Shimada, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 193 days.

(21) Appl. No.: 18/021,001

(22) PCT Filed: Aug. 19, 2020

(86) PCT No.: PCT/JP2020/031227
§ 371 (c)(1),
(2) Date: Feb. 13, 2023

(87) PCT Pub. No.: WO2022/038701
PCT Pub. Date: Feb. 24, 2022

(65) Prior Publication Data
US 2024/0037215 A1    Feb. 1, 2024

(51) Int. Cl.
*G06F 21/56*    (2013.01)
*G06F 21/51*    (2013.01)

(52) U.S. Cl.
CPC ........ *G06F 21/51* (2013.01); *G06F 2221/033* (2013.01)

(58) Field of Classification Search
CPC ..... G06F 21/51; G06F 21/56; G06F 2221/033
See application file for complete search history.

(56) References Cited

U.S. PATENT DOCUMENTS

| 2017/0006049 A1 | 1/2017 | Muttik | |
| 2019/0220596 A1* | 7/2019 | Lie | G06F 18/24 |
| 2019/0265955 A1* | 8/2019 | Wolf | G06F 11/36 |

FOREIGN PATENT DOCUMENTS

JP    2017-505947 A    2/2017

OTHER PUBLICATIONS

Stringer: Measuring the Importance of Static Data Comparisons to Detect Backdoors and Undocumented Functionality by Garcia et al. (Garcia); published 2017 (Year: 2017).*
International Search Report for PCT Application No. PCT/JP2020/031227, mailed on Nov. 17, 2020.
(Continued)

*Primary Examiner* — Vu V Tran

(57) ABSTRACT

A program analysis device including: code block extraction means for extracting code blocks having specific qualities from code blocks included in binary data of a program; backdoor score calculation means for calculating, for each code block extracted by the code block extraction means, based on the contents of operations in each code block, a backdoor score, which is a score indicating the possibility of each code block being a backdoor code or a score indicating the degree of impact of each code block on a system when it is executed; and output means for outputting the code blocks extracted by the code block extraction means and the backdoor score calculated for each of the extracted code blocks by the backdoor score calculation means.

6 Claims, 9 Drawing Sheets

(56) References Cited

OTHER PUBLICATIONS

Chandrasekar Ravi, R Manoharan, "Malware Detection using Windows Api Sequence and Machine Learning", International Journal of Computer Applications (0975-8887), vol. 43—No. 17, Apr. 2012, pp. 12-16.

Thomas, Sam L et al., Stringer, "Measuring the Importance of Static Data Comparisons to Detect Backdoors and Undocumented Functionality", Computer Security—ESORICS 2017, 2017, pp. 513-531.

* cited by examiner

PROGRAM ANALYSIS DEVICE, PROGRAM ANALYSIS METHOD, AND COMPUTER-READABLE MEDIUM

This application is a National Stage Entry of PCT/JP2020/031227 filed on Aug. 19, 2020, the contents of all of which are incorporated herein by reference, in their entirety.

TECHNICAL FIELD

The present disclosure related to a program analysis device, a program analysis method, and a computer-readable medium.

BACKGROUND ART

Infrastructures and enterprise systems have become increasingly complex in recent years. Thus, these infrastructures and enterprise systems are constituted not only by the devices of a single company but by also devices of various enterprises procured from outside suppliers and combined with each other, and this technique of procuring and combining is now a common technique.

However, numerous incidents have been reported in which backdoors are found in the software (or the firmware) or the hardware that are procured from outside suppliers. A "backdoor" referred to in the specification of the present application can be defined, for example, as a function incorporated as a part of software that includes multiple functions and which is undisclosed to and unwanted by users.

Therefore, manufacturers that organize construction of infrastructures or enterprise systems need to perform inspection as to whether or not backdoors are contained in the programs constituting software procured from outside suppliers.

To date, methods for inspecting programs from various perspectives have been made public, and an example thereof is a method of detecting vulnerabilities contained in a program or determining whether or not a program is malware by performing static analysis or dynamic analysis of the program.

In many cases, determination of whether or not a program to be analyzed is malware is performed based on a signature contained in the program. For instance, Non-Patent Literature 1 discloses a technique of performing analysis using the type and the order of API (Application Programming Interface) executed by a program as feature amount to thereby determine whether or not the whole program is malware.

CITATION LIST

Non-Patent Literature

Non-Patent Literature 1: Chandrasekar Ravi, R Manoharan, "Malware Detection using Windows Api Sequence and Machine Learning", International Journal of Computer Applications (0975-8887), Volume 43-No. 17, April 2012

SUMMARY OF INVENTION

Technical Problem

As described above, Non-Patent Literature 1 discloses the contents of operations executed by a program, more specifically, a technique of determining whether or not the whole program is malware by performing analysis using the type and the order of API executed by a program as feature amount.

However, a backdoor is a code that has been incorporated as a part of a legitimate program. Therefore, by only analyzing the feature amount of a program to be analyzed for the entire codes of the program to be analyzed as in the technique disclosed in Non-Patent Literature 1, it is not possible to determine the possibility of a backdoor being contained in the program.

Therefore, in order to extract candidates of backdoor codes from the program to be analyzed, a person who analyzes the program needs to compare the program codes with the specifications or to manually examine the program codes, which is time-consuming for the person who analyzes the program.

An object of the present disclosure is to provide, in light of the aforementioned problem, a program analysis device, a program analysis method, and a computer-readable medium each adapted to extract candidates of backdoor codes from a program without a person who analyzes the program having to compare the program codes with the specifications or to manually examine the program codes.

Solution to Problem

According to a first aspect of the present disclosure, a program analysis device includes:
  code block extraction means for extracting code blocks having specific qualities from code blocks included in binary data of a program;
  backdoor score calculation means for calculating, for each code block extracted by the code block extraction means, based on the contents of operations in each code block, a backdoor score, which is a score indicating the possibility of each code block being a backdoor code or a score indicating the degree of impact of each code block on a system when it is executed; and
  output means for outputting the code blocks extracted by the code block extraction means and the backdoor score calculated for each of the extracted code blocks by the backdoor score calculation means.

According to a second aspect of the present disclosure, a program analysis method for analyzing a program executed by a program analysis device, includes:
  an extraction step of extracting code blocks having specific qualities from code blocks included in binary data of the program;
  a calculation step of calculating, for each code block extracted by the code block extraction means, based on the contents of operations in each code block, a backdoor score, which is a score indicating the possibility of each code block being a backdoor code or a score indicating the degree of impact of each code block on a system when it is executed; and
  an output step of outputting the code blocks extracted by the code block extraction means and the backdoor score calculated for each of the extracted code blocks by the backdoor score calculation means.

According to a third aspect of the present disclosure, a non-transitory computer-readable medium stores a program for causing a computer to execute:
  an extraction step of extracting code blocks having specific qualities from code blocks included in binary data of the program;
  a calculation step of calculating, for each code block extracted by the code block extraction means, based on the contents of operations in each code block, a backdoor score, which is a score indicating the possibility of each code block being a backdoor code or a score indicating the degree of impact of each code block on a system when it is executed; and an output step of outputting the code blocks extracted in the extraction step and the backdoor score calculated for each of the extracted code blocks in the calculation step.

Advantageous Effects of Invention

According to the aforementioned aspect, an effect can be achieved of extracting candidates of backdoor codes from a program without a person who analyzes the program not having to compare the program codes with the specifications or to manually examine the program codes in detail.

EXAMPLE EMBODIMENT

Hereinbelow, example embodiments will be described with reference to the drawings. Note that in the example embodiments, the same or corresponding elements are designated by the same reference symbols, and duplicate descriptions will be omitted.

First Example Embodiment

Figure 1:
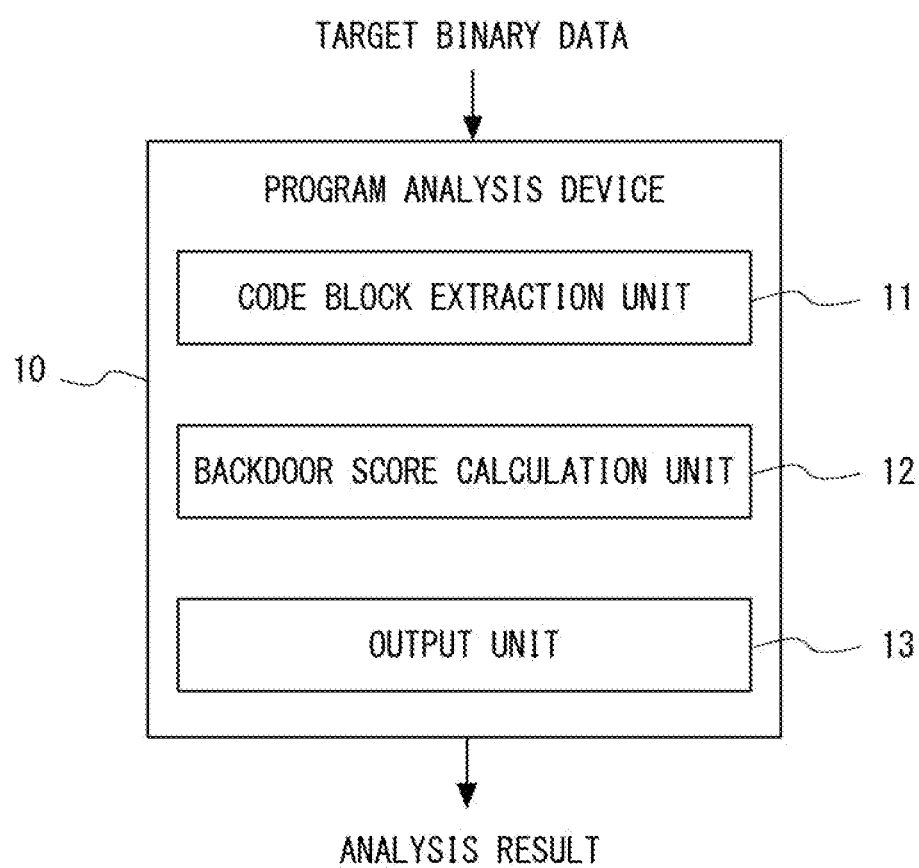
FIG. 1 is a block diagram showing a configuration example of a program analysis device according to a first example embodiment.

Hereinbelow, a first example embodiment will be described. FIG. 1 is a block diagram showing a configuration example of a program analysis device 10 according to the first example embodiment. As shown in FIG. 1, the program analysis device 10 includes a code block extraction unit 11, a backdoor score calculation unit 12, and an output unit 13.

The code block extraction unit 11 inputs the binary data of a program to be analyzed (hereinafter referred to as target binary data). The code block extraction unit 11 extracts all code blocks having specific qualities from the codes included in the target binary data. The code blocks described herein refer to a code group in unit of function or basic blocks in a program. Further, code blocks having specific qualities are, for example, dead code blocks. Note that details of dead code blocks will be described in the following second example embodiment. The code block extraction unit 11 outputs code blocks extracted from the target binary data.

The backdoor score calculation unit 12 inputs the code blocks extracted by the code block extraction unit 11. The backdoor score calculation unit 12 calculates, for each code block extracted by the code block extraction unit 11, based on the contents of operations in each code block, a backdoor score, which is a score indicating the possibility of each code block being a backdoor code or a score indicating the degree of the impact of each code block on the system when it is executed. The system described here, is for example, a computer that includes an environment for executing a program to be analyzed. The backdoor score calculation unit 12 outputs the backdoor score calculated for each code block.

The output unit 13 inputs the code blocks extracted by the code block extraction unit 11 and backdoor score calculated for each of the extracted code blocks by the backdoor score calculation unit 12. The output unit 13 outputs the code blocks and the backdoor score for each of the code blocks as an analysis result. At this time, the output unit 13 can output the analysis result, for example, in a form in which a backdoor score is assigned to each code block.

Next, an example of processing operation of the program analysis device will be described. Note that FIG. 1 will be referred to as appropriate in the following description.

Figure 2:
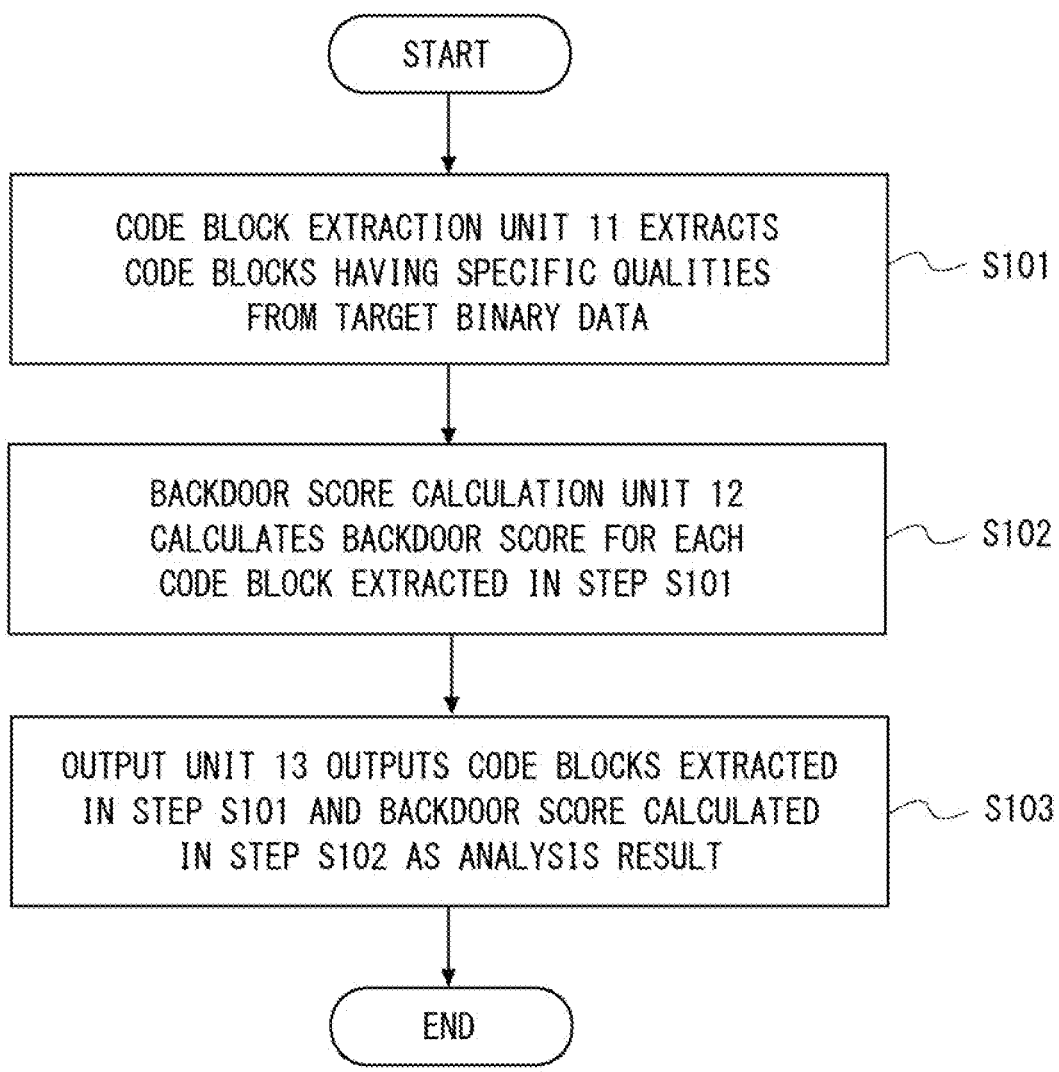
FIG. 2 is a flowchart describing flow of an example of processing operation of the program analysis device according to the first example embodiment.

FIG. 2 is a flowchart describing flow of an example of processing operation of the program analysis device 10.

As shown in FIG. 2, first, the code block extraction unit 11 extracts all code blocks having specific qualities from the codes included in the target binary data (Step S101). Next, the backdoor score calculation unit 12 calculates the backdoor score for each code block extracted in Step S101 (Step S102). Finally, the output unit 13 outputs the code blocks extracted in Step S101 and the backdoor score calculated for each of the extracted code blocks in Step S102 as an analysis result (Step S103).

As described above, according to the first example embodiment, the code block extraction unit 11 extracts the code blocks having specific qualities from the target binary data. The backdoor score calculation unit 12 calculates the backdoor score for each code block extracted by the code block extraction unit 11 based on the contents of operations in the extracted code block. The output unit 13 outputs the code blocks extracted by the code block extraction unit 11 and the backdoor score calculated for each of the extracted code blocks by the backdoor score calculation unit 12 as an analysis result.

Accordingly, it is possible to indicate the code blocks that are candidates for the backdoor codes included in a program to be analyzed and the backdoor score for the code blocks to a person who analyzes the program. Therefore, the person who analyzes a program can extract candidates for the backdoor codes from the program without having to compare the program codes with the specifications or manually examining the program codes.

Second Example Embodiment

Hereinbelow, a second example embodiment will be described.

Figure 3:
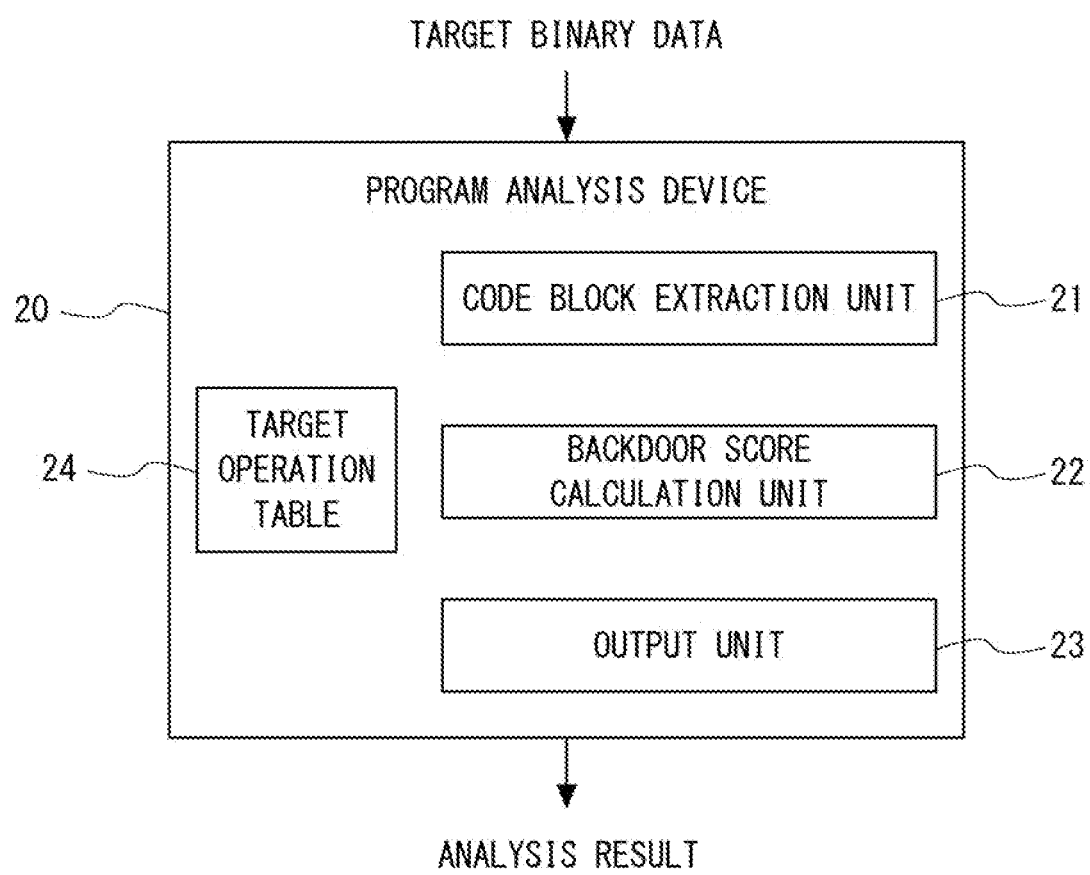
FIG. 3 is a block diagram showing a configuration example of a program analysis device according to a second example embodiment.

FIG. 3 is a block diagram showing a configuration example of a program analysis device 20 according to the second example embodiment. As shown in FIG. 3, the program analysis device 20 includes a code block extraction unit 21, a backdoor score calculation unit 22, an output unit 23, and a table of target operations (hereinafter referred to as a target operation table) 24.

The code block extraction unit 21 inputs the target binary data. First, the code block extraction unit 21 performs static analysis or the like of the target binary data and creates a control flow graph of the whole program. Next, based on the information such as the created control flow graph, the code block extraction unit 21 extracts all code blocks having specific qualities from the codes included in the target binary data. Next, the code block extraction unit 21 outputs the code blocks extracted from the target binary data.

Code blocks having specific qualities are, for example, dead code blocks. Dead code blocks refer to code blocks that cannot be reached through a normal control flow when a program is executed.

Figure 4:
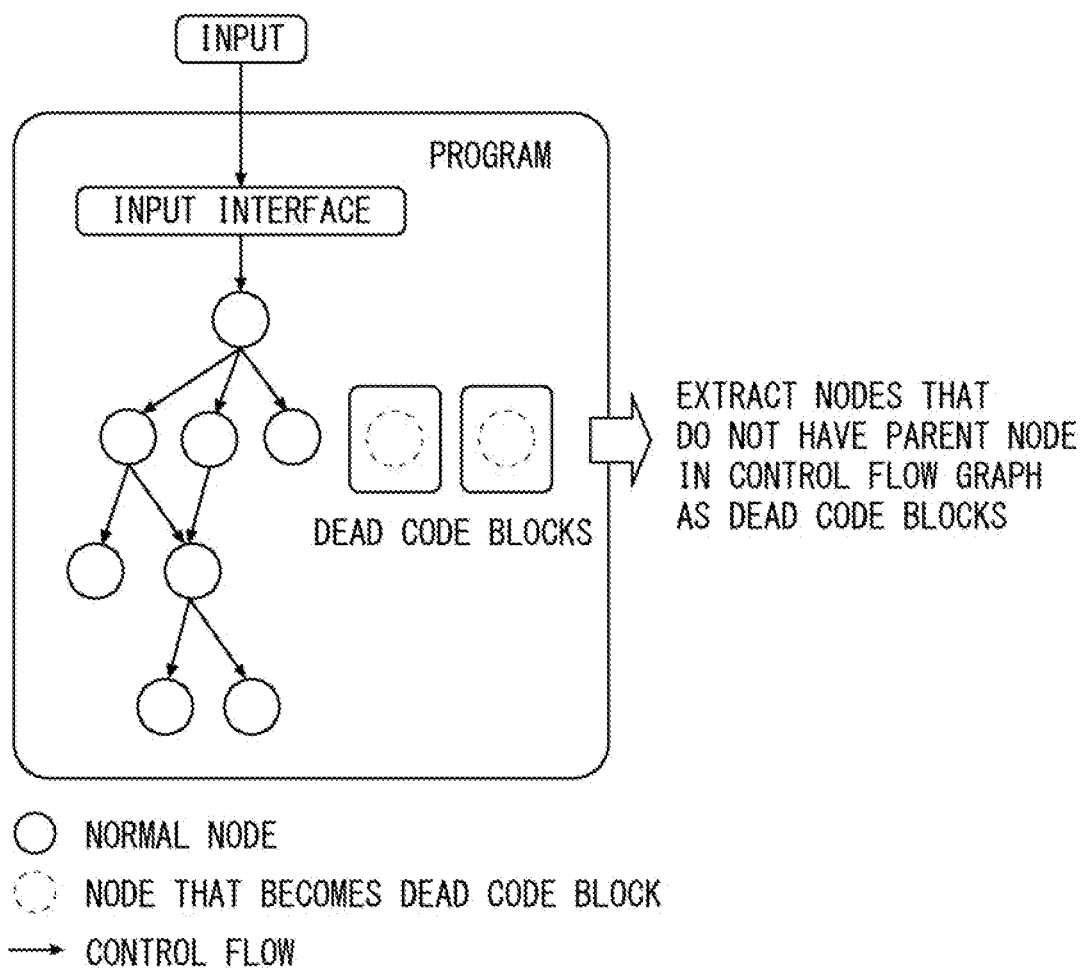
FIG. 4 is a schematic diagram describing dead code blocks that are examples of code blocks having specific qualities.
Figure 5:
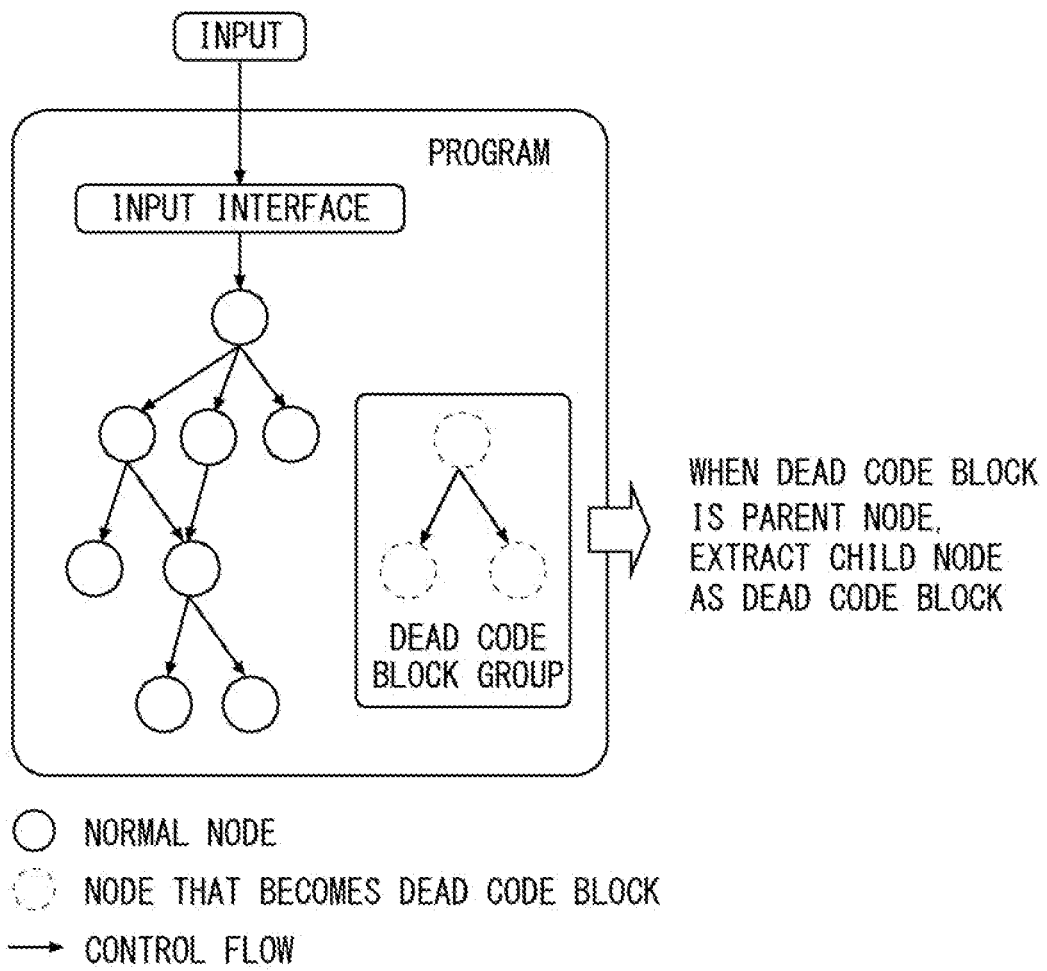
FIG. 5 is a schematic diagram describing dead code blocks that are examples of code blocks having specific qualities.

Here, examples of a method of extracting dead code blocks will be described with reference to FIGS. 4 and 5. FIGS. 4 and 5 each shows an example of a control flow graph of a program in which solid circles denote normal nodes, dashed circles denote nodes that become dead code blocks, and the arrows denote the control flow (the same in FIGS. 6 and 7 described below). For example, as shown in FIG. 4, when a node does not have a parent node in the control flow graph, the code block extraction unit 21 extracts the node that does not have a parent node as a dead code block. Further, as shown in FIG. 5, when a parent node having a child node is a dead code block, the code block extraction unit 21 may also extract the child node as a dead code block.

Figure 6:
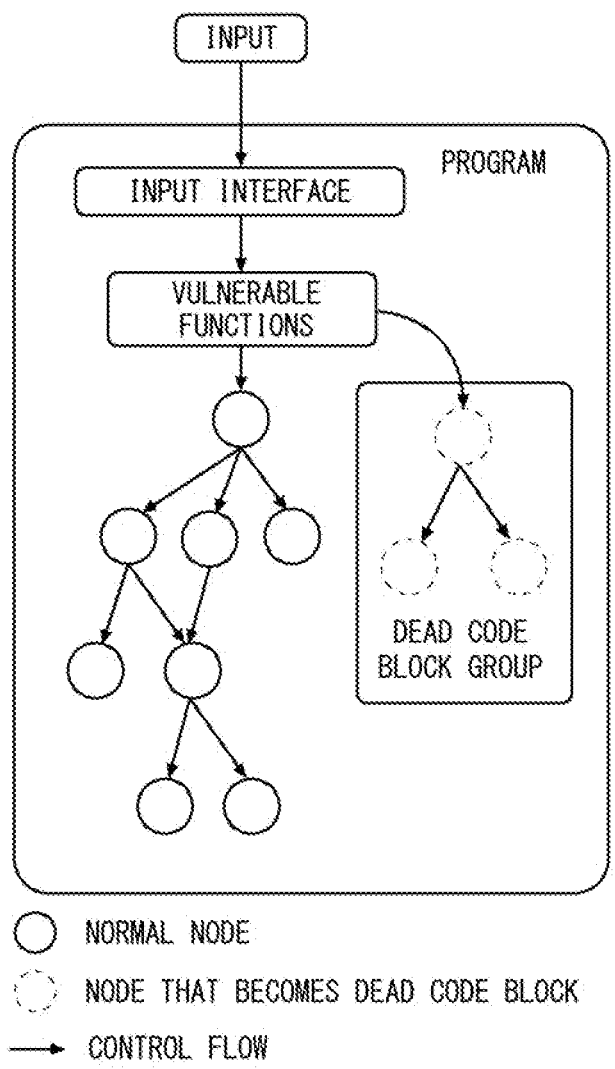
FIG. 6 is a schematic diagram describing dead code blocks that are examples of code blocks having specific qualities.

The aforementioned dead code block is not executed as long as normal input values are given to the program. However, as shown in FIG. 6, in the case where the program has a vulnerability, the dead code block may be called by vulnerable functions under certain conditions, such giving a special input value.

Figure 7:
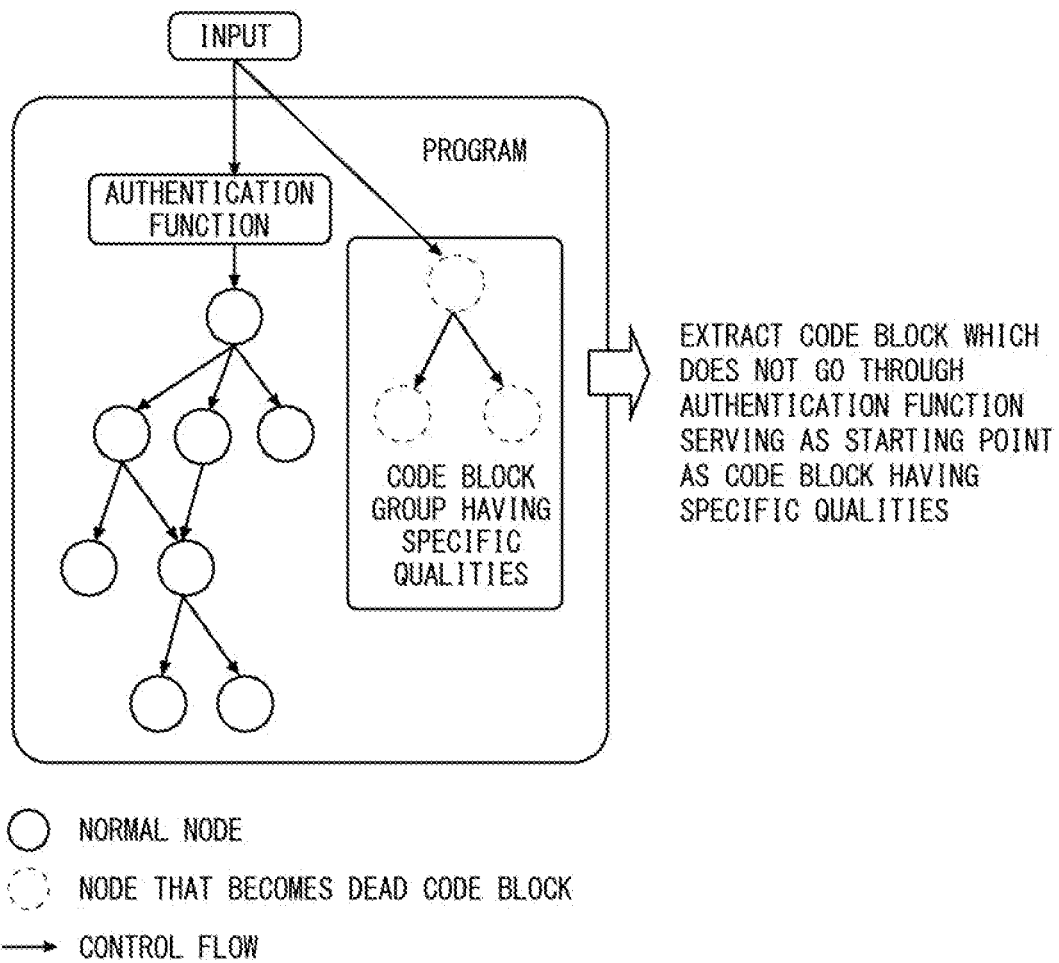
FIG. 7 is a schematic diagram describing another examples of code blocks having specific qualities.

Further, code blocks other than the aforementioned dead code blocks may serve as code blocks having specific qualities. For example, in normal execution of a program, code blocks which do not go through a prescribed function as a starting point that must be passed through, specifically, an authentication function or a parser function, may serve as code blocks having specific qualities. For example, in the example of FIG. 7, there is an authentication function that serves as a starting point. In the case of FIG. 7, the code block extraction unit 21 may extract code blocks which do not go through an authentication function as code blocks having specific qualities.

The backdoor score calculation unit 22 inputs the code blocks extracted by the code block extraction unit 21. Hereinafter, the backdoor score calculation unit 22 performs processing by referring to the target reference table 24. In the target reference table 24, operations to be performed and the score determined for each operation are registered in advance by a user (e.g., a person who requests for inspection of a program, a person who analyzes a program, and the like). Note that in the example shown in FIG. 3, the target reference table 24 is provided inside the program analysis device 20 but it may be provided to an external storage device.

Firstly, the backdoor score calculation unit 22 adds together, for each code block extracted by the code block extraction unit 21, the scores determined for respective operations of the extracted code block in the case where the extracted code block includes operations that are registered in the target operation table 24. In this way, the backdoor score calculation unit 22 calculates a backdoor score, which is a score indicating the possibility of each code block being a backdoor code or a score indicating the degree of the impact of each code block on the system when it is executed. Next, the backdoor score calculation unit 22 outputs the backdoor score calculated for each code block.

The output unit 23 inputs the code blocks extracted by the code block extraction unit 21 and backdoor score calculated for each of the extracted code blocks by the backdoor score calculation unit 22. The output unit 23 outputs the code blocks and the backdoor score for each of the code blocks as an analysis result.

The output format of code blocks may be symbol information in the target binary data, the relative address of each code block, the code block name that is named at the time of analysis of the program, and the like.

Further, the code blocks may be output in a form in which a backdoor score is assigned to each code block.

Note that in the program analysis device 20 shown in FIG. 3, a program to be analyzed is in a binary format and it is assumed that the binary data of the program to be analyzed is input, however, source codes may be the target of analysis. In this case, the code block extraction unit 21 may input the source codes to be analyzed, compile the input source codes, and convert the compiled codes into a binary format. Further, the code block extraction unit 21, the backdoor score calculation unit 22, or an unillustrated processing unit may be utilized in performing analysis of the information obtained from the source codes.

Next, an example of processing operation of the program analysis device Note that FIG. 3 will be referred to as appropriate in the following description will be described.

Figure 8:
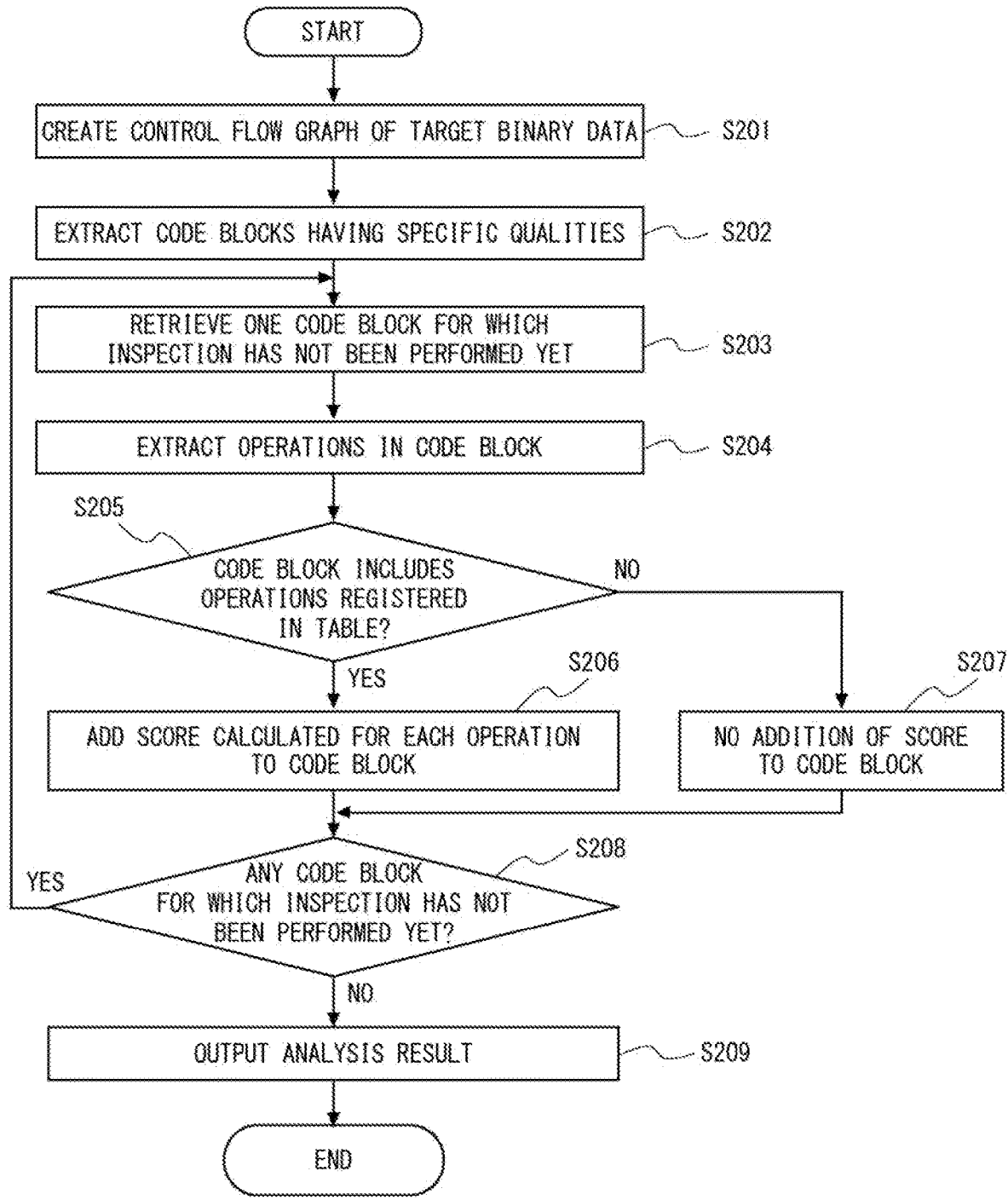
FIG. 8 is a flowchart describing flow of an example of processing operation of a program analysis device according to a second example embodiment.

FIG. 8 is a flowchart describing flow of an example of processing operation of the program analysis device 20.

As shown in FIG. 8, first, the code block extraction unit 21 performs static analysis or the like of target binary data and creates a control flow graph (Step S201). Next, based on the information such as the created control flow graph, the code block extraction unit 21 extracts all code blocks having specific qualities, represented by dead code blocks, from the codes included in the program (Step S202).

Next, the backdoor score calculation unit 22 retrieves one code block for which inspection has not been performed yet from the code blocks that have been extracted in Step S202 (Step S203), and then performs inspection for the code block that has been retrieved.

To be more specific, the backdoor score calculation unit 22 extracts a list of operations included in the code block retrieved in Step S203 (Step S204) and then determines, by referring to the target operation table 24, whether or not the operations extracted in Step S204 include the operations registered in the target operation table 24 (Step S205). In the case where the extracted code block includes the operations registered in the target operation table 24 (YES in Step S205), the backdoor score calculation unit 22 calculates the backdoor score by adding together the scores for the respective operations registered in the target operation table 24 to the extracted code block (Step S206). On the other hand, in the case where the extracted code block does not include the operations registered in the target operation table 24 (NO in Step S205), the backdoor score calculation unit 22 does not add any score to the extracted code block (Step S207).

This is the completion of the inspection of the code blocks retrieved in Step S203.

Next, the backdoor score calculation unit 22 determines whether or not there is a code block for which inspection has not been performed yet among the code blocks extracted in Step S202 (Step S208). When there is a code block for which inspection has not been performed yet (YES in Step S208), the backdoor score calculation unit 22 returns to the processing of Step S203 and retrieves a code block for which inspection has not been performed yet and then performs inspection for the code block that has been retrieved. On the other hand, when there is no code block for which inspection has not been performed (NO in Step S208), the processing of Step S209 is performed.

Finally, the output unit 23 outputs the code blocks extracted in Step S202 and the backdoor score calculated for each of the extracted code blocks in Step S206 as an analysis result (Step S209).

Note that examples of the operations registered in advance in the target operation table 24 include operations of calling all or one of a list of system calls, a part of prescribed library functions, and a part of prescribed API, and the like.

Further, besides those described above, the operations registered in advance in the target operation table 24 include operations that, if performed improperly, such as an operation of accessing the global variables included in a program, would have a serious impact on the program or on a system including an environment for executing the program.

Further, not only the operations but also the scores determined for each of the operations are registered in advance in the target operation table 24. For example, the scores for the operations is score p in the case where an operation of calling a system call is performed, score q in the case where an operation of calling a library function A is performed, and score r in the case where an operation of accessing a global variable B included in the program is performed.

Therefore, in Step S206, for example, in the case where the code block to be inspected includes an operation of calling a system call and a library function A, the backdoor score calculation unit 22 calculates the backdoor score for the code block to be inspected to be p+q.

As described above, according to the second example embodiment, the code block extraction unit 21 extracts code blocks that cannot be reached through a normal control flow when a program is executed from the target binary data as code blocks having specific qualities. In the case where the code blocks extracted by the code block extraction unit 21 include operations registered in advance by a user, the backdoor score calculation unit 22 calculates the backdoor score by adding together the scores determined for the respective operations in advance. The output unit 23 outputs the code blocks extracted by the code block extraction unit 21 and the backdoor score calculated for each of the extracted code blocks by the backdoor score calculation unit 22.

Accordingly, it is possible to indicate the code blocks that are candidates for the backdoor codes included in a program to be analyzed and the backdoor score for the code blocks to a person who analyzes the program. Therefore, the person who analyzes a program can extract candidates for the backdoor codes from the program without having to compare the program codes with the specifications or manually examining the program codes.

Further, the user who is a person performing analysis can register by himself/herself, the operations that may be included in the code blocks that are candidates for the backdoor codes. Therefore, the user can determine which code blocks are to be extracted as the candidates for the backdoor codes.

Other Example Embodiments

Figure 9:
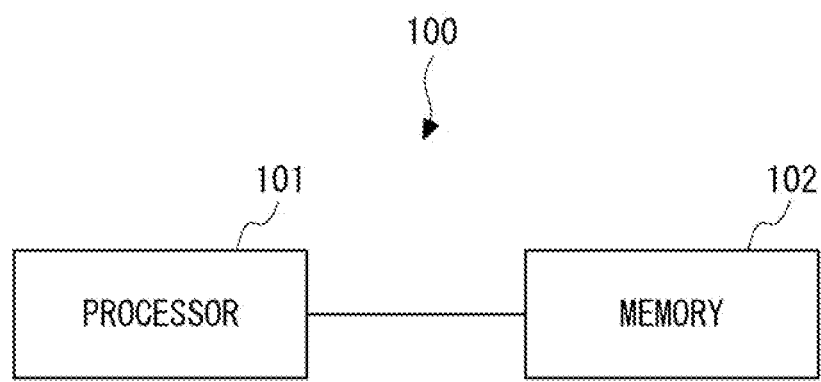
FIG. 9 is a diagram showing an example of a hardware configuration of a program analysis device.

FIG. 9 is a diagram showing an example of a hardware configuration of a program analysis device 100. In FIG. 9, the program analysis device 100 includes a processor 101 and a memory 102. The processor 101 may be, for example, a microprocessor, a MPU (Micro Processing Unit), or a CPU (Central Processing Unit). The processor 101 may include a plurality of processors. The memory 102 is configured of a combination of a volatile memory and a non-volatile memory. The memory 102 may include a storage disposed separately from the processor 101. In this case, the processor 101 may access the memory 102 through an illustrated I/O (Input/Output) interface.

The program analysis devices 10, 20 according to the first and the second example embodiments can have a hardware configuration shown in FIG. 9. Further, the code block extraction units 11, 21, the backdoor score calculation units 12, 22, and the output units 13, 23 in the program analysis devices 10, 20 may be realized by the processor 101 reading and executing the program stored in the memory 102. Further, the target operation table 24 in the program analysis device 20 may be stored in the memory 102.

The above-described program for implementing the program analysis devices 10, 20 can be stored by using any of various types of non-transitory computer-readable media and supplied to a computer. Examples of non-transitory computer-readable media include magnetic storage media (e.g., flexible disks, magnetic tapes, and hard disk drives), magneto-optical storage media (e.g., magneto-optical disks), CD-ROM (Compact Disc-Read Only Memory), CD-R (CD-Recordable), CD-R/W (CD-ReWritable), semiconductor memory (e.g., mask ROM, PROM (Programmable ROM), EPROM (Erasable PROM)), flash ROM, and RAM (Random Access Memory)). The aforementioned program may also be supplied to a computer through any of various types of transitory computer-readable media. Examples of the transitory computer-readable media include electrical signal, optical signal, and electromagnetic waves. The transitory computer-readable media can supply the program to the program analysis devices 10, 20 via a wired communication path such as electric wires and optical fibers, or a wireless communication path.

The present invention has been described above with reference to the example embodiments. However, the present disclosure is not limited to the aforementioned example embodiments. Note that the configuration and details of the present disclosure can be changed in any way within the scope of the present disclosure that is understandable by a person skilled in the art.

REFERENCE SIGNS LIST

10 PROGRAM ANALYSIS DEVICE
11 CODE BLOCK EXTRACTION UNIT
12 BACKDOOR SCORE CALCULATION UNIT
13 OUTPUT UNIT
20 PROGRAM ANALYSIS DEVICE
21 CODE BLOCK EXTRACTION UNIT
22 BACKDOOR SCORE CALCULATION UNIT
23 EXTRACTION UNIT
24 TARGET OPERATION TABLE
100 PROGRAM ANALYSIS DEVICE

101 PROCESSOR
102 MEMORY

What is claimed is:

1. A program analysis device comprising:
at least one memory storing instructions; and
at least one processor configured to execute the instructions to:
extract code blocks having specific qualities from code blocks included in binary data of a program;
calculate, for each code block that is extracted, based on the contents of operations in each code block, a backdoor score, which is a score indicating the possibility of each code block being a backdoor code or a score indicating the degree of impact of each code block on a system when it is executed; and
output the code blocks that are extracted and the backdoor score that is calculated for each of the extracted code blocks,
wherein the at least one processor is further configured to execute the instructions to:
extract, from the code blocks included in the binary data, code blocks that cannot be reached through a normal control flow when the program is executed as the code blocks having specific qualities; or
extract, from the codes included in the binary data, code blocks which do not go through the prescribed function as the code blocks having specific qualities.

2. The program analysis device according to claim 1, wherein in the case where the code blocks that are extracted include operations registered in advance by a user, the at least one processor is further configured to execute the instructions to calculate the backdoor score for each code block by adding together the scores predetermined for the respective operations.

3. The program analysis device according to claim 2, wherein the operations registered in advance by the user include an operation of calling all or one of a list of system calls, a part of prescribed library functions, and a part of prescribed API (Application Programming Interface).

4. The program analysis device according to claim 2, wherein the operations registered in advance by the user includes an operation of accessing global variables in the program.

5. A program analysis method for analyzing a program executed by a program analysis device, comprising:
extracting code blocks having specific qualities from code blocks included in binary data of the program;
calculating, for each code block that is extracted, based on the contents of operations in each code block, a backdoor score, which is a score indicating the possibility of each code block being a backdoor code or a score indicating the degree of impact of each code block on a system when it is executed; and
outputting the code blocks that are extracted step and the backdoor score calculated for each of the extracted code blocks,
wherein the program analysis method further comprises:
extracting, from the code blocks included in the binary data, code blocks that cannot be reached through a normal control flow when the program is executed as the code blocks having specific qualities; or
extracting, from the codes included in the binary data, code blocks which do not go through the prescribed function as the code blocks having specific qualities.

6. A non-transitory computer-readable medium storing a program executable by a computer to perform processing comprising:
extracting code blocks having specific qualities from code blocks included in binary data of the program;
calculating, for each code block that is extracted, based on the contents of operations in each code block, a backdoor score, which is a score indicating the possibility of each code block being a backdoor code or a score indicating the degree of impact of each code block on a system when it is executed; and
outputting the code blocks that are extracted and the backdoor score calculated for each of the extracted code blocks,
wherein the processing further comprises:
extracting, from the code blocks included in the binary data, code blocks that cannot be reached through a normal control flow when the program is executed as the code blocks having specific qualities; or
extracting, from the codes included in the binary data, code blocks which do not go through the prescribed function as the code blocks having specific qualities.

* * * * *